Figure 1:
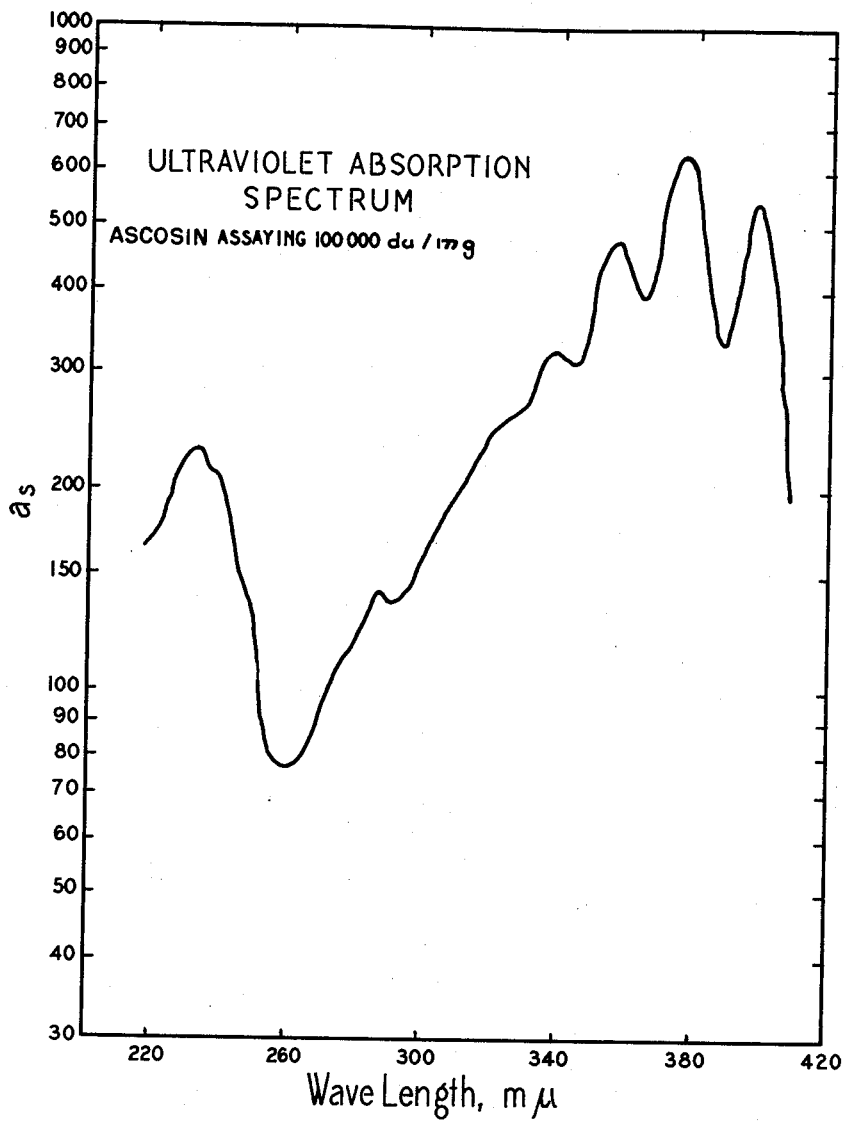

Nov. 8, 1955                I. R. COHEN                2,723,216
ASCOSIN AND PROCESS OF PRODUCING SAME
Filed Oct. 4, 1951                                3 Sheets-Sheet 1

Nov. 8, 1955   I. R. COHEN   2,723,216
ASCOSIN AND PROCESS OF PRODUCING SAME
Filed Oct. 4, 1951   3 Sheets-Sheet 3

2,723,216

ASCOSIN AND PROCESS OF PRODUCING SAME

Isadore R. Cohen, Terre Haute, Ind., assignor to Commercial Solvents Corporation, Terre Haute, Ind., a corporation of Maryland Application October 4, 1951, Serial No. 249,815

8 Claims. (Cl. 167—65)

The present invention relates to a new and useful antibiotic, and to methods for its production and recovery. More particularly, it relates to the antibiotic ascosin and to its production by submerged fermentation of nutrient media by the hitherto undescribed species of microorganism which I have called *Streptomyces canescus*.

In the past a great number of metabolic products of the growth of bacteria and fungi have been produced and isolated, some of which have met with considerable success in the treatment of diseases and infections resulting from pathogenic microorganisms. Those antibiotics which have proven acceptable for such uses, however, are effective against limited fields of organisms. Thus, penicillin, the first useful antibiotic commercially produced by fermentation, is mainly effective against Gram positive organisms only. Antibiotics more recently discovered, such as aureomycin and Terramycin, are effective against a range of both Gram positive and Gram negative organisms, and are at present in widespread use. Some antibiotic materials, the metabolic products of growth of microorganisms, have been reported to be effective against fungi. Notable among these substances are streptothricin, fradicin, mycosubtilin, actidione, glutinosin and trichothecin. None of these latter antibiotics, however, has been found to be acceptable for treatment of diseases and infections in humans and animals because of undesirable properties such as extremely high toxicity, development of resistant strains of the organism being combatted, and ineffectiveness when administered orally. The search for effective antifungal materials has, therefore, been diligently prosecuted by various commercial and governmental research laboratories over the past years.

I have now discovered a new antibiotic material which, in vitro tests is shown to possess both fungistatic and fungicidal activity against a wide range of pathogenic yeasts and filamentous fungi and which, in tests with mice, is shown to be of low toxicity while being capable of maintaining blood levels for a period after intraperitoneal injection. The material, known under the generic name, ascosin, has not yet been proved useful for human therapy.

Attempts to crystallize the antibiotic which I have designated as ascosin have not been successful, and the exact chemical composition and properties thereof have not been determined since the material presently available is of low purity. Evidence adduced thus far with the purest material isolated indicates that ascosin is probably a polyene, possibly a carotenoid type compound. Crude ascosin is readily soluble in aqueous pyridine, aqueous picolines and aqueous quinoline but only slightly soluble in other organic solvents tested including dry pyridine, dry quinoline, phenol, methyl alcohol, formamide, butyl alcohol, ethyl acetate, chloroform, n-butyl acetate and amyl acetate. The antibiotic is also slightly soluble in water and in aqueous solutions of the above-mentioned organic solvents. Ascosin is soluble in, but inactivated by, phosphoric acid, dipropyl hydrogen phosphate, dibutyl hydrogen phosphate and aromatic sulfonic acids. The material is insoluble in dioxane, and acetic anhydride.

My new antifungal agent is probably a weak acid, as evidenced by its ability to form amorphous precipitates with $Ag^+$, $Ba^{++}$, $Fe^{+++}$. Other evidence indicates that it is an organic acid. The compound gives a negative ninhydrin test, proving the absence of —$NH_2$ radicals. No color is developed when ascosin is contacted with $FeCl_3$, indicating that the compound is not phenolic. Aqueous brucine yields an amorphous precipitate while methanolic brucine yields no precipitate.

I have found that an intense, unstable blue color is produced when a methanolic solution of ascosin is added to phosphoric acid of 35% or higher concentration in the presence of air. Such a color test has been observed for certain polyenes and, although the mechanism of this phenomenon is not apparent, it offers a supporting test for identification of my new antibiotic material. Dilution of the resulting blue solution with water or methyl alcohol readily discharges the color. Concentrated sulfuric acid or hydrochloric acid can be substituted for the phosphoric acid in the above-described test, however, the hydrochloric acid produces a green color.

Ascosin displays characteristic absorption bands in the ultra-violet and near ultra-violet range of the spectrum. In the ultra-violet region, when the antibiotic is dissolved in methanol, the absorption curve shows maximum absorption at about 234 m$\mu$, 288 m$\mu$, 340 m$\mu$, 357 m$\mu$, 376 m$\mu$, and 398 m$\mu$. Minimum absorption occurs at 260 m$\mu$, 292 m$\mu$, 345 m$\mu$, 365 m$\mu$, and 388 m$\mu$. When 1 ml. of the methyl alcohol solution of ascosin is warmed to 60° for about 1 hour in the presence of 0.1 ml. of concentrated HCl, the maxima and minima are shifted slightly in wave length, but the major difference immediately apparent is in the reduction in absorption at the major peaks in the region 330-410 m$\mu$. Especially important is the great decrease occurring in absorption at 398 m$\mu$. Figure 1 is a graph of the ultraviolet absorption spectrum of ascosin.

Figure 2:
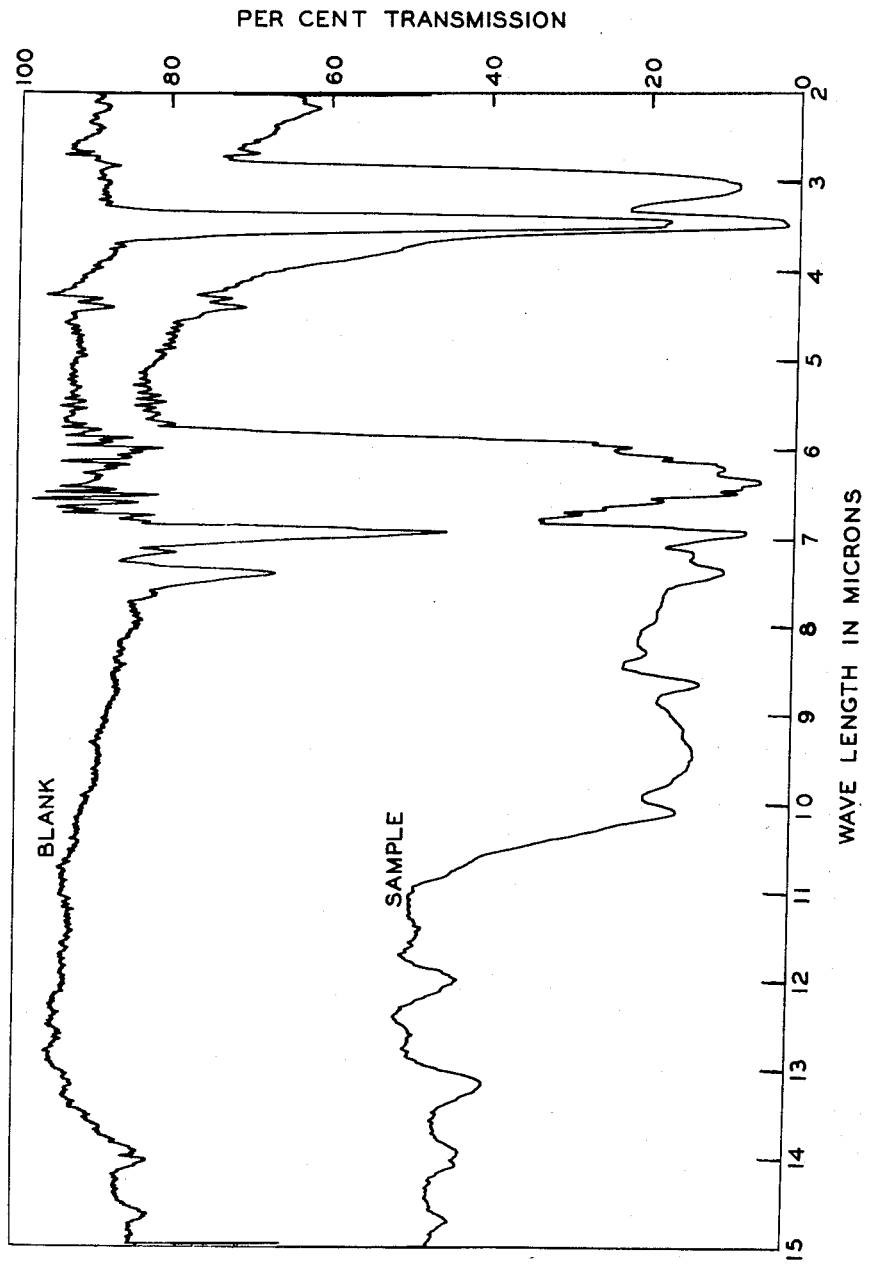

Ascosin exhibits characteristic absorption bands in the infrared region of the spectrum at the following wavelengths expressed in microns: 3.0, 6.4, 8.7, 9.5, 10.1, 12.0, and 13.2. Figure 2 is a graph of the infrared spectrum wherein ascosin as a mineral oil mull is the sample which is compared with a mineral oil blank.

Ascosin is not inactivated during 24 hour contact at 37° C. with bacteria, including *E. coli, Staph. aureus, Strep. fecalis* and *Pseudomonas* sp. The material is not readily inactivated or reversed by compounds containing a mercapto group including cysteine, glutathione, sodium thioglycollate and 2,3-dimercapto-1-propanol, but the action appears to be reversed by oleate, linoleate, and linolenate. Liquid serial dilution studies have shown no reduction in the antifungal activity of ascosin in the presence of agar or gelatin, little reduction with dextrin and significant reduction with starch, perhaps through absorption.

My new antibiotic is effective against a wide range of yeasts and filamentous fungi; in fact, no yeasts thus far tested appear highly resistant to ascosin. Both fungistatic and fungicidal activities are exhibited by the agent. Ascosin shows no sporicidal activity (against untreated spores of *A. niger*) nor is it active against most types of bacteria. It is also evidently inactive against Streptomycetes.

In the following tables are given the results of tests to determine the sensitivity of various microorganisms to ascosin. The test methods employed were either (1) liquid serial dilution, or (2) agar plate dilution. The former is anaerobic while the latter is aerobic. The basal medium was Difco phenol red broth base supplemented with 1% glucose and 0.1% yeast extract, at pH 7.3. For the agar plates, 2% agar was included. In some instances other media were employed as indicated.

The potency of the antibiotic is measured in dilution units (d. u.). A dilution unit is the amount of ascosin which will just inhibit a stock strain of *Saccharomyces cerevisiae* in 1 ml. of Difco phenol red broth supplemented with 1% glucose, at pH 7.3, when incubated for 24 hours at 28° C. A 100 ml. portion of broth is inoculated with 0.7 ml. of a suspension of the yeast in saline which shows 50% of the light transmission of a saline control in test tubes measuring 15–16 mm. (I. D.) using a red filter.

TABLE I

*Ascosin activity against some filamentous fungi (agar dilution)*

| Organism[a] | Inhibited by dil. u./ml. |
| --- | --- |
| Trichophyton mentagrophytes | 8 (Approx.). |
| Verticillium albo-atrum[b] 650–2 | >400. |
| Penicillium chrysogenum Q176 | >400. |
| Penicillium citrinum 410–8 | 200. |
| Penicillium patulum 410–3 | 50. |
| Penicillium spinulosum 410–4 | 3.2. |
| Aspergillus niger ATCC 6276 | 3.2. |
| Aspergillus terreus 50–2 | >400. |
| Aspergillus wentii 50–7[b] | >400. |
| Trichoderma viride | 50. |
| Rhizopus nigricans (+) 530–3 | 3.2. |
| Streptomyces vinaceous | >400. |
| Thamnidium elegans 620–1 | 3.2. |
| Helminthosporium sativum 280–4 | 1.6 to 3.2. |
| Phycomyces blakesleeanus 450–1 | 3.2. |
| Alternaria solani 30–1 | 3.2 (Approx.). |
| Fusarium culmorum 220–3 | 200. |
| Cunninghamella elegans 180–2 | >400. |
| Ceratostomella ulmi (Waksman #185) | 200. |
| Eremothecium ashbyii, Sand 314 | 3.2. |
| Botrytis cinerea[b] 60–1 | >400. |
| Mucor sp.[b] | >400. |
| Xylaria hypoxylon 670–1[b] | >400. |

[a] Incubated 3 to 5 days at 25° C.
[b] Potato dextrose agar.

TABLE II

*Ascosin activity against some yeasts by the agar dilution technique (48 hrs. at 28° C.)*

| Organism | Inhibited by dil. u./ml. |
| --- | --- |
| Saccharomyces cerevisiae (plant) | 3.2 to 6.2. |
| Saccharomyces ellipsoideus ATCC 2366 | 6.2. |
| Saccharomyces lactis ATCC 8635 | 12.4. |
| Endomyces magnusii ATCC 2105 | 6.2. |
| Rhodotorula mucilaginosa ATCC 7360 | 3.2. |
| Rhodotorula sanniei ATCC 4057 | 3.2. |
| Schizosaccharomyces pombe ATCC 2476 | 1 (Approx.). |
| Candida albicans (Wegrich) | 6.2. |
| Candida guilliermondia NRRL Y-324 | 6.2. |
| Candida flareri NRRL Y-245 | 12.4. |
| Cryptococcus neoformans 3715 (Emmons) | 10 (Approx.). |

TABLE III

*Ascosin activity against some yeasts by liquid serial dilution technique (24 hrs. at 28° C.)*

| Organism | Inhibited by dil. u./ml. |
| --- | --- |
| Saccharomyces lactis ATCC 8635 | 3.2 |
| Saccharomyces cerevisiae (plant) | 1 |
| Saccharomyces ellipsoideus ATCC 2366 | 1.6 |
| Candida albicans (Wegrich) | 1.2 |
| Candida guilliermonda NRRL Y-324 | 1.6 |
| Cryptococcus neoformans[a] (Mayo) | 1.2 |
| Candida flareri NRRL Y-245 | 1.6 |
| Candida monosa NRRL Y-1879 | 6.4 |
| Rhodotorula mucilaginosa ATCC 7360 | 1.2 |
| Rhodotorula sanniei ATCC 4057 | 0.8 |
| Endomyces magnusii ATCC 2105 | 2.4 |

[a] Run in brain-heart-dextrose infusion, 48 hrs., 37° C.

Sensitivity tests with additional yeasts were run by liquid serial dilution technique and by the agar dilution technique. Tests using both techniques were run at pH 7.3 and at pH 5.6. Several of the yeasts would not grow in the pH 7.3 medium, though they did grow at pH 5.6. The results are given in Table IV.

TABLE IV

*Relative activity of ascosin against some yeasts by serial dilution methods at pH 7.3 and pH 5.6*

Incubation: 24 hrs. at 28° C. for broth, 48 hrs. on agar.
Inoculum: 1 drop of a light, arbitrary suspension in saline to 5 ml. broth, or streak of suspension on agar.

| | Ascosin to inhibit, dil. u./ml. | | | |
| --- | --- | --- | --- | --- |
| Yeast Culture, NRRL No. | P.R.* broth at— | | P. R.* agar pH 7.3 | Sabouraud agar pH 5.6 |
| | pH 7.3 | pH 5.6 | | |
| Candida krusei Y-301 | 4 | 3.2 | 14 | 200 |
| Candida pulcherrima Y-775 | 1 | 1.6 | 1.8 | 25 |
| Candida lipolytica Y-1094 | 8 | 12.5 | 38 | 400 |
| Candida tropicalis Y-619 | 8 | 12.5 | 14 | 400 |
| Mycoderma cerevisiae Y-932 | 4 | 3.2 | 7 | 50 |
| Kloeckera brevis Y-915 | n. g. | 1.6 | n. g. | 50 |
| Zygosaccharomyces mandshuricus Y-54 | 2 | 6.3 | 1.8 | 50 |
| Torulaspora rosei Y-1567 | 1 | 3.2 | 1.8 | 50 |
| Debaromyces matruchoti Y-833 | 8 | 6.3 | 38 | 400 |
| Endomycopsis javanensis Y-1483 | n. g. | 0.5 | n. g. | 6.2 |
| Pichia alcoholophila Y-368 | 1 | 0.2 | 1.8 | 12.5 |
| Schizosaccharomyces pombe Y-675 | n. g. | 0.8 | n. g. | 0.8 |
| Brettanomyces anomalus Y-1415 | n. g. | 0.1 | n. g. | 12.5 |
| Hansenula saturnus Y-12 | 1 | 0.4 | 1.8 | 50 |
| Saccharomycodes ludwigii Y-974 | n. g. | 1.6 | n. g. | 6.2 |
| Saccharomyces cerevisiae (plant), control | 2 | 1.6 | 3.5 | 50 |

N. g. = No growth evident under these conditions.
Note: All of the media contained 1% glucose.
* Phenol red.

The pathogenic fungus causing histoplasmosis, *Histoplasma capsulatum*, has been investigated for susceptibility to ascosin both in the filamentous form and in the yeast phase. The yeast phase is found in the disease. The mycelial phase appeared to be resistant to ascosin through 400 d. u./ml., with readings made after 10 to 12 days' incubation at 25° C. The yeast phase, however, was found to be sensitive to ascosin. A concentration of about 1.6 d. u./ml. gave inhibition after 4 to 5 days at 36–37° C., while good yeast growth was observed on two controls and at 0.4 d. u./ml.

To demonstrate the ability of ascosin to diffuse through living tissue and to maintain blood levels for a period following intraperitoneal injection, the following test was conducted: A sample of ascosin, assaying approximately 4,000 d. u./mg. was dissolved in aqueous bicarbonate saline and administered intraperitoneally to 20 mice at 40,000 d. u./kg. in single doses. Blood samples were taken by sterile heart puncture at the intervals noted in Table V. The blood samples were citrated and the plasmas were assayed for ascosin anti-fungal activity.

TABLE V

*Mouse blood levels of ascosin following intraperitoneal administration in single doses*

| Hours after Administration | Blood Assays (Average) d. u./ml. in Plasma |
| --- | --- |
| 2 | 231 |
| 4 | 224 |
| 6 | 137 |
| Control (no drug) | 0 |

To determine the actuate intraperitoneal mouse toxicity of ascosin, material assaying 4,000 d. u./mg. was administered to mice which were then held 7 days and posted. The following results were obtained:

$LD_0$, 18 mg./kg. or 72,000 d. u./kg.; $LD_{50}$, 22 mg./kg. or 88,000 d. u./kg.; $LD_{100}$, 27 mg./kg. or 108,000 d. u./kg.

The acute oral mouse toxicity was determined by oral administration of ascosin assaying 2,000 d. u./mg. No death occurred within 7 days after administration of doses up to 500 mg./kg., thus indicating an $LD_0$ of more than 1,000,000 d. u./kg.

The following are results of acute subcutaneous mouse toxicity tests 14 days after single subcutaneous doses:

| Dose, mg./kg | 72 | 96 | 120 | 144 | 168 | 192 |
|---|---|---|---|---|---|---|
| Dose, d. u./kg | 288,000 | 384,000 | 480,000 | 576,000 | 672,000 | 768,000 |
| Mortality: Ratio | 0/5 | 1/5 | 2/5 | 0/5 | 2/5 | 2/5 |

My new antibiotic material is produced by a hitherto undescribed species of microorganism which I have called *Streptomyces canescus*. The organism was first isolated as a contaminant of molds used in attempts to produce vitamin $B_{12}$. A plate was observed to be contaminated with an unidentified green mold, which was isolated and grown on additional sterile plates. The green mold grew profusely, completely covering the plate except for a small circular area which appeared gray. Closer observation revealed that the green mold had also become contaminated with an unknown microorganism which apparently produced a substance toxic to the green mold. Isolation of this contaminant resulted in the discovery of the new organism of my invention. A culture of the organism has been deposited with the Northern Utilization Research Branch, United States Department of Agriculture, Peoria, Illinois, under the number NRRL 2419.

The specific name "canescus" is derived from the Latin "canesco" which means "to grow gray." The organism produces aerial conidia in chains and cannot use phenol as a carbohydrate source. This organism is mesophilic and aerobic. Pigment is not produced on calcium malate agar and in certain organic media, including milk and gelatin. When the pigment is produced, it is an amber turning brown and may be considered faint. The pigment forms on both inorganic and organic media. The brown pigment is not formed on all organic media nor is it of the highly chromogenic types. No growth is observed when the organism is incubated at 43° C.

When grown on Bennett's agar at 25° C. *Streptomyces canescus* is spore-bearing, aerial hyphae straight and curved, monopodially, well branched and never producing regular spirals. Conidiophores are richly septate. Conidia occur in chains, usually globose with a diameter of 1.0 to $1.3\mu$. The length of oval conidia is 1.3 to $2.6\mu$. Conidiophores are 1.2 to $1.3\mu$ in diameter, while vegetative mycelium is much finer. The organism is Gram positive.

The following characteristics are observed in colonial morphology, growth-habits and biochemical reactions when grown on the substrates listed:

*Gelatin stab.*—Complete liquefaction was observed after 3 weeks' incubation at 25° C. A gray, wrinkled colony developed on the surface. No pigment production was observed.

*Bennett's agar plates.*—Colonies circular, 25° C., 7 days' incubation, effuse to convex, edge filamentous. Color varying from gray-white to gray; reverse brown. Texture of colony appears powdery. No diffusible pigment.

*Soluble starch agar plates.*—Spreading powdery growth, 25° C., 5 days' incubation, white margin, faint pink center; reverse yellow to brownish. Hydrolysis of starch occurred 3 cm. from edge of colony.

*Milk solid plates.*—Gray colony, 25° C., 5 days' incubation, reverse brown, a clear zone surrounding the colony.

*Glycerol plates.*—25° C., 5 days' incubation, wrinkled gray to slightly pink growth, reverse yellow to amber. A slight brown pigment diffused in the medium.

*Glycerol slant.*—25° C., 6 days' incubation, gray growth over entire surface; at base of slant very wrinkled brown in hue; reverse amber. Brown pigment diffused throughout the medium.

*Calcium malate agar plates.*—25° C., 9 days; mycelium gray to rose-gray; reverse yellow to tan; slight digestion of calcium malate at edge of colony. No soluble pigment formed.

*Beef heart blood agar plates.*—Hemolysis was observed after 48 hours' incubation at 36° C. Mycelium is dark gray, wrinkled, no sporulation, (96 hrs.) reverse is tan to deep brown.

*Potato plug.*—Light gray, spreading, wrinkled growth. The potato becomes brown throughout the plug.

*Dorset egg medium.*—Tan, very wrinkled growth on surface of slant. No sporulation observed after 10 days' incubation. Slight white sporulation observed 14 days. A soluble brown pigment formed after 21 days. Odor of hydrogen sulfide detected with formation of pigment.

*Sabouraud's agar slant.*—At ±28° C. Growth first white, dull-shiny, spreading, translucent; reverse tan. After 7 days' incubation at 28° C. the growth is beaded, slightly wrinkled at the base of the slant, grayish-white; reverse tan to amber. An amber pigment was diffused throughout the medium. After 14 days a faint greenish hue observed in aerial mycelium.

*Bennett's agar slant.*—Gray, spreading, wrinkled growth, reverse yellow to brownish. Slight brownish pigment diffused in medium after 7 days, 25° C.

*Litmus milk.*—At 36° C. milk becomes alkaline (pH 8.4). A soft rennet curd formed after 48 hours is completely peptonized in 12 days. A white, cartilaginous ring of growth 1 cm. wide forms at surface of tube; reverse of growth is brown.

*Bennett's broth.*—Three to seven days, a heavy, white to grayish-white, wrinkled pellicle forms at the surface of the broth. At 37° C. the broth is clear with an amber to brownish pigment diffused throughout and becomes slightly alkaline (pH 7.9). A flaky sediment is formed when the organism is incubated at 25° C. or 28° C.

*Carbohydrate beef-extract broths.*—Seven days' incubation, 25° C. Pellicle formation, white, powdery, wrinkled. No gas was formed. Slight brown pigment formed with galactose, lactose, mannose, dextrin, salicin, mannitol and dextrose. The reaction is in general quite alkaline. The pH of the media varies from 7.3 when glycerol is the carbohydrate to 8.7 when sucrose is added.

*Nitrate reductions.*—Three to ten days' incubation, 36° C. No nitrate reduction with either beef extract+0.1% $KNO_3$ agar or broth.

*Indole.*—Not produced after 3 days' incubation at 36° C. Kovack's reagent was used.

*Inorganic carbohydrate agar.*—No growth was observed on inorganic agar made with distilled water. When Pridham's formula was used containing traces of Cu, Mn, and Fe the organism was able to grow on the agar containing the following as carbohydrate sources: glycerol, salicin, galactose, dextrin, mannitol, dextrose, soluble starch, trehalose, arabinose, maltose, xylose, and sucrose. A light brown pigment was produced except when trehalose, maltose, xylose, and sucrose were used as the sole source of carbohydrate. Growth on Pridham's medium observed after 10 days' incubation at 25° C.

Optimum temperature for growth of *Streptomyces canescus* is 36° C. No growth occurs at 5° C., or at 43° C. The organism is aerobic, but can grow in aerobic submerged culture.

My new antibiotic substance, described in detail above, is produced by propagating *Streptomyces canescus* also described above, in a suitable nutrient medium under conditions of time, temperature, pH, etc. as will be described in detail hereinafter. The nutrient medium contains a source of carbon such as an assimilable carbohydrate, and a source of nitrogen, organic or inorganic. Suitable sources of carbon include glycerol, dextrin, starch, lactose, cellulose and sucrose. As nitrogen sources there can be used glycine, Kelkote (ground refined protein from soy flour), kelsovsoy (very finely ground refined protein from soy flour), soybean oil meal (expeller) (meal obtained by pressing as opposed to solvent extracted meal), nutrisoy (dry soybean meal-like product), cottonseed meal, gelatin and Ossein concentrate (concentrated albumenoid material which remains after treating bones with dilute hydrochloric acid). For best antibiotic production the total weight of the carbohydrate should comprise from about 0.25 to 4.0% by weight of the media, and the nitrogen source from about 0.25 to 4.0%.

With a single stage inoculum development, amounts of inoculum ranging from 0.25% to 4.0% (v./v.) can be used without significant differences in ascosin production. The pH of the fermentation medium should be between about 6 and 8 and preferably about 7.2. The temperature which can be employed ranges from about 24° C. to about 38° C. but it is preferred to carry out the fermentation at a temperature of about 32° C. Maximum yields of ascosin are produced after about 48 hrs. fermentation, with no falling off in assay by the end of 120 hrs.

Figure 3:
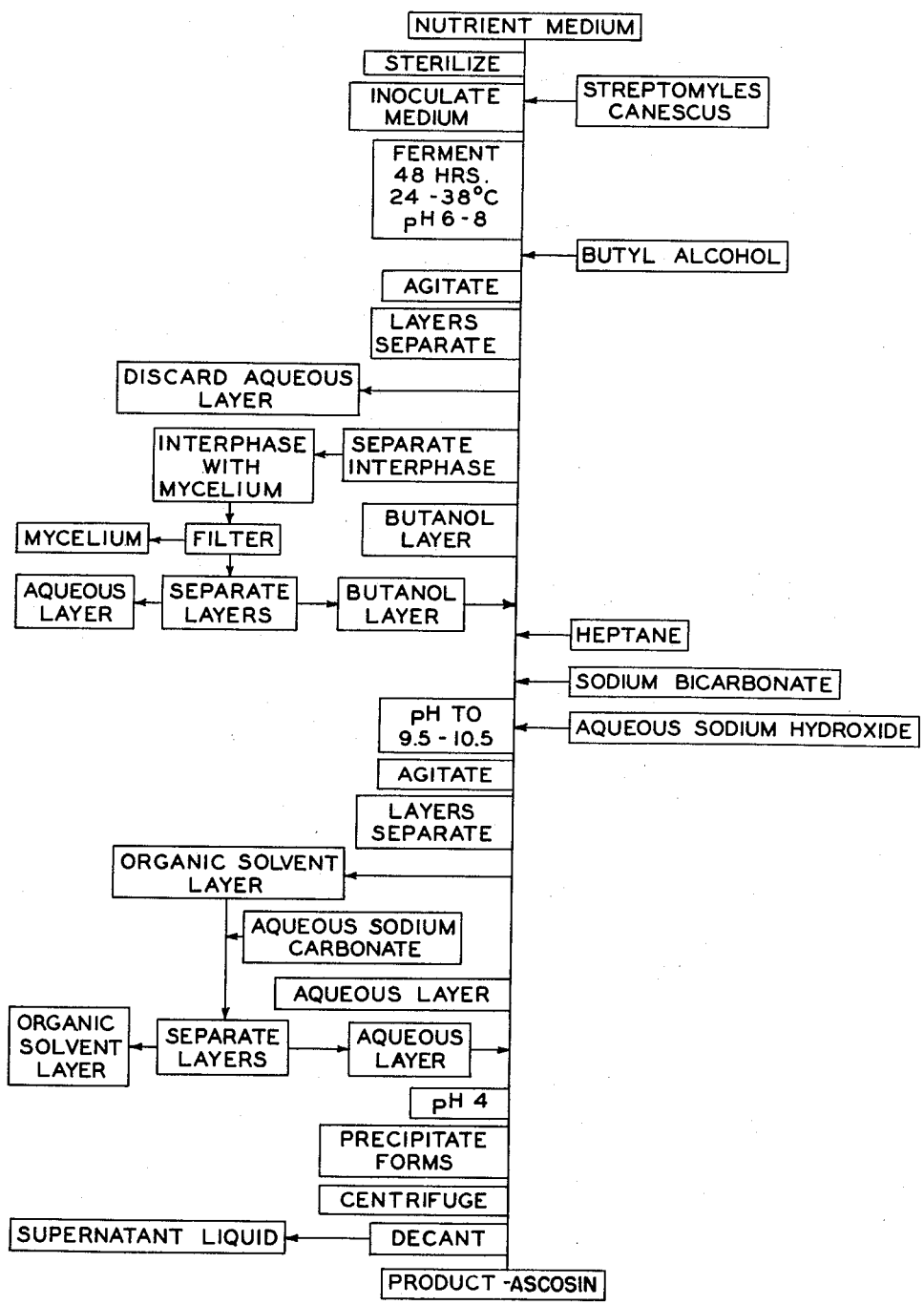

The following specific example is given to illustrate the production of ascosin with *Streptomyces canescus*. The process of the example is illustrated in the accompanying flow sheet, Fig. 3.

EXAMPLE I

The culture used in this example had been maintained in a lyophilized condition at 0–5° C., on sterile sand— a small quantity of this sand was used to inoculate 200 ml. of a sporulation medium consisting of:

| | Per cent |
|---|---|
| Cerelose (refined glucose) | 1.0 |
| NZ Amine A (tryptic digest of casein) | 1.0 |
| Yeast extract | 0.1 |
| Beef extract | 0.1 |
| Agar | 4.0 |

The culture was grown for 3 days at 28° C. and the spores then rolled off the surface with sand and 200 ml. of water containing a synthetic detergent.

A medium was next prepared consisting of:

| | Per cent |
|---|---|
| Beef extract | 1.0 |
| Bactopeptone | 1.0 |
| Cerelose (refined glucose) | 1.0 |

One hundred ml. of this medium was sterilized for 20 minutes at 121° C. in a 500 ml. flask, then inoculated with 1 ml. of the spore suspension and incubated for 24 hours at 36° C., on a reciprocating shaker.

For production of ascosin, about 2 ml. of the mycelial inoculum was used to inoculate 100 ml. of a medium containing:

| | Per cent |
|---|---|
| Amidex (starch hydrolysate product) | 2.0 |
| Ossein concentrate | 1.0 |
| By 500 corn base | 0.25 |

After sterilization at 121° C. this medium had a pH of 6.8. It was then incubated for 48 hrs. at 32° C., with agitation by a rotary shaker operating at 200 R. P. M. Recovery of the antibiotic was accomplished by the procedure described below.

The ascosin produced in accordance with the above described or equivalent methods can be recovered from the fermentation broth by various methods utilizing the chemical and physical properties of the active material. A convenient method involves direct extraction from the fermentation liquor with butyl alcohol. According to this procedure the broth is extracted batch-wise at pH 7 to 8 by ⅓ volume of n-butyl alcohol. After agitation for 10 to 20 minutes, the layers are allowed to separate. Separation of the layers usually requires 20 to 30 minutes. The bottom aqueous or spent layer is then drawn off and discarded. The clear butyl alcohol layer is siphoned off, the remaining interphase, consisting mainly of mycelium, is filtered through a small layer of a filter aid and the filtrate again separated into aqueous and organic phases.

To the combined butyl alcohol extracts is then added an equal volume of commercial heptane or Stoddard solvent. About 8 grams of sodium bicarbonate is then added per gallon of butyl alcohol extract. The pH of the mixture is then adjusted to 9.5–10.5 with a concentrated solution of sodium hydroxide in water. After agitating for 10 minutes the aqueous layer, containing the agent, is allowed to separate, then collected and immediately refrigerated.

The organic solvent layer is then extracted with 1/10% (w./v.) aqueous sodium carbonate. This second extract must also be kept at low temperatures to avoid inactivation. The ascosin is next precipitated from the alkaline, aqueous extract by adjusting the pH to 4, decanting the supernatant and centrifuging the amorphous precipitate.

The following specific example is given to illustrate the above described recovery procedure:

EXAMPLE II

A 5,400 ml. portion of the fermentation liquor resulting from propagation of the organism *Streptomyces canescus* for 72 hrs. in a medium consisting of 1% Ossein concentrate, 2% Amidex and 0.25% BY 500 in water, extracted with 1,800 ml. n-butyl alcohol by agitating the mixture for 20 minutes and allowing two layers to separate. To the butyl alcohol extract (1240 ml.) was added 1,400 ml. commercial heptane and 3 grams of sodium bicarbonate (Concentrate I). The spent alcohol-heptane solution was then re-extracted two times with 100 ml. of 1% (w./v.) sodium carbonate (Concentrates II and III). The results of ascosin assays are given in Table VI.

TABLE VI

| | ml. | Assay d. u./ml. | d. u.×$10^6$ | Pptd. Ascosin mg. | Potency | d. u.×$10^6$ |
|---|---|---|---|---|---|---|
| Whole Beer | 5,400 | 800<br>*6,400 | 4.3<br>34.6 | | | |
| Spent Beer | | 40 | | | | |
| Concentrate I | 135 | 32,000 | 4.3 | 139 | >27,250 <40,800 | >3.8 <5.7 |
| Concentrate II | 116 | 64,000 | 7.4 | 204 | >59,500 <84,500 | >12.1 <18.2 |
| Concentrate III | 95 | 4,000 | .4<br>12.1 | 343 | | >16 <24 |

*Whole beer diluted 1:1 with pyridine before steaming.

The figures given in the resume above indicate an almost quantitative yield across the extraction step and a satisfactory over-all recovery.

The yield per gallon of whole beer on isolated material was 245 mg. of an average potency of >47,000 <70,000 d. u./mg. or a total of >11.5 <17.1×$10^6$ d. u. Consequently the original beer assayed at least >3000 <4500 d. u./ml. on a basis of 100% over-all recovery.

Somewhat more potent preparations can be obtained by stirring the fermentation broth with a filter aid, and filtering the mixture at a pH of about 6.0. The active material can then be eluted from the dried filter cake with methyl alcohol. The residues of such methyl alcohol extracts assay approximately 100,000, and can be recovered in yields of about 75%. Products of improved potency result if the filter cake is first pre-extracted with a hydrocarbon solvent to remove inactive fats and oils.

I claim:

1. A polyene substance effective in inhibiting the the growth of yeast and filamentous fungi and relatively ineffective against bacteria, said substance exhibiting the properties of a weak acid, being soluble in aqueous pyridine, aqueous picolines and aqueous quinoline and slightly soluble in dry pyridine, dry quinoline, phenol, methyl alcohol, formamide, butyl alcohol, ethyl acetate, chloroform, butyl acetate, amyl acetate and water; being soluble in but inactivated by phosphoric acid, dipropyl hydrogen phosphate, dibutyl hydrogen phosphate and aromatic sulfonic acids; and insoluble in acetic anhydride and dioxane; methanolic solutions of said substance displaying maximum absorption of ultra-violet light at 234 m$\mu$, 288 m$\mu$, 340 m$\mu$ 358 m$\mu$, 376 m$\mu$, and 399 m$\mu$, and minimum absorption at 260 m$\mu$, 292 m$\mu$, 346 m$\mu$, 366 m$\mu$, and 389 m$\mu$; and methanolic solutions of said substance producing an intense, unstable blue color when added, in the presence of air, to phosphoric acid of greater than 35% strength and said substance exhibiting characteristic absorption bands in the infra-red region of the spectrum at the following wave lengths expressed in microns: 3.0, 6.4, 8.7, 9.5, 10.1, 12.0, 13.2.

2. A process for producing ascosin, which comprises propagating a culture of *Streptomyces canescus* in an aqueous nutrient medium under submerged aerobic conditions.

3. A process for producing ascosin, which comprises propagating a strain of *Streptomyces canescus* in an aqueous nutrient medium under submerged aerobic conditions at a temperature between about 24° C. and about 38° C. for a period of from one to five days.

4. A process for producing ascosin, which comprises propagating a culture of *Streptomyces canescus* in an aqueous nutrient medium under submerged aerobic conditions at a temperature between about 24° C. and about 38° C. for a period of from one to five days, and recovering the so produced ascosin from the resulting fermentation liquor.

5. A process for producing ascosin, which comprises propagating a culture of *Streptomyces canescus* in an aqueous nutrient-containing, carbohydrate solution having a pH from 6 to 8, under submerged aerobic conditions, at a temperature between about 24° C. and about 38° C. for from one to five days and recovering the ascosin from the resulting fermentation liquor.

6. A process which comprises the steps of aerobically fermenting an aqueous nutrient liquor at a temperature within the range from about 24° C. to about 38° C. at a pH between 6 and 8 with the organism *Streptomyces canescus*, whereby ascosin is produced.

7. A process for the production of ascosin which comprises growing under aerobic conditions a culture of *Streptomyces canescus* in an aqueous medium having a pH between 6 and 8 and containing a soluble carbohydrate and a source of assimilable nitrogen at temperatures within the range from about 24° C. and about 38° C. for a period of time of about one to five days, whereby the aqueous medium is fermented and ascosin is produced, and recovering the ascosin from the fermented liquor.

8. The process of claim 6 wherein the recovery of ascosin includes the step of extracting the antibiotic into butyl alcohol at a pH of about 6.

References Cited in the file of this patent

UNITED STATES PATENTS

| | | |
|---|---|---|
| 2,482,055 | Duggar | Sept. 13, 1949 |
| 2,516,080 | Sobin | July 18, 1950 |

OTHER REFERENCES

Waksman et al.: J. Bacteriology, vol. 42, 1941, pp. 243, 245 and 248..

Alexopoulos: Ohio Jour. of Sci., 1941, pp. 425 to 430.

Whiffen et al.: J. Bacteriology, vol. 52, 1946, pp. 610 and 611.

Klener: Proc. Soc. Exp. Biol. Med., vol. 63, November 1946, pp. 227 to 230.

Schatz et al.: "Mycologia," vol. 40, 1948, pp. 461, 462 and 475.

Johnson et al.: J. Bacteriology, September 10, 1947, vol. 54, p. 281.

Leben: Phytopathology, vol. 38, p. 16, January 1947.

Squibb Abstracts, vol. 22, March 30, 1949, p. A-320.

Waksman et al.: Science, March 25, 1949, vol. 109, pp. 305 to 307.

Brown et al.: Proc. Soc. Exptl. Biol. and Med., July 1949, pp. 454 to 457.

Swart et al.: Proc. Soc. Exp. Biol. Med., March 1950, vol. 73, pp. 376 and 377.

Woolridge et al.: J. Invest. Derm., November 1950, vol. 15, pp. 351 to 353.

Swart et al.: Arch. of Biochem., vol. 24, November 1949, pp. 100 to 103.

Leben et al.: "An Antibiotic Substance Active Against Certain Phytopathogens," Phytopathology 38, November 1948, pp. 899 to 906.

Dunshee et al.: "The Isolation and Properties of Antimycin A," Jour. Am. Chem. Soc., July 1949, pp. 2436–2437. QD–1–A5.

Hickey et al.: Antibiotics and Chemotherapy, September 1952, pp. 472–473, 482 and 483.

Kilgman: Proc. Soc. Exp. Biol. and Med., vol. 82, pp. 399–404, 1953.

Lechevalier et al.: Mycologia, vol. XLV, No. 2, pp. 155–171, March–April 1953.

Lechevalier: Extraite de le Presse Medicale, October 17, 1953, 11 pp.

J. A. M. A., August 15, 1953, vol. 152, No. 16, p. 1565.

Taber et al.: Antibiotic and Chemotherapy, April 1954, pp. 455–461.

Frank: J. Inv. Derm., August 1954, pp. 75–76, vol. 23, No. 2.

Welch: Antibiotics Annual 1953–1954, pp. 191–194, article by Dutcher et al.